United States Patent [19]

Kimura et al.

[11] Patent Number: 5,132,676
[45] Date of Patent: Jul. 21, 1992

[54] LIQUID CRYSTAL DISPLAY

[75] Inventors: Yuji Kimura, Yokohama; Hitoshi Kondo, Machida; Eiichi Ohta, Yokohama, all of Japan

[73] Assignee: Ricoh Company, Ltd., Tokyo, Japan

[21] Appl. No.: 524,803

[22] Filed: May 18, 1990

[30] Foreign Application Priority Data

May 24, 1989 [JP] Japan .................................. 1-130895

[51] Int. Cl.⁵ .......................................... G09G 3/36
[52] U.S. Cl. ........................................ 340/784; 359/58
[58] Field of Search ............... 340/784, 771, 775, 779; 358/241, 236; 350/334, 335, 336, 339 R; 359/58, 60, 54, 79, 87, 84

[56] References Cited

U.S. PATENT DOCUMENTS

| | | | |
|---|---|---|---|
| 4,523,811 | 6/1985 | Ota | 350/339 R |
| 4,572,615 | 2/1986 | Nickol et al. | 350/339 R |
| 4,676,603 | 6/1987 | Fertig | 350/336 |
| 4,697,331 | 10/1987 | Boulitrop et al. | 350/336 |
| 4,768,863 | 9/1988 | Fertig et al. | 350/339 R |
| 4,783,368 | 11/1988 | Yamamoto et al. | 428/408 |
| 4,861,141 | 8/1989 | Nakazawa | 350/336 |
| 4,907,861 | 3/1990 | Muto | 350/336 |

*Primary Examiner*—Ulysses Weldon
*Assistant Examiner*—Xiao Min Wu
*Attorney, Agent, or Firm*—Oblon, Spivak, McClelland, Maier & Neustadt

[57] ABSTRACT

A liquid crystal display has a liquid crystal layer supported by a pair of substrates therebetween; a transparent common electrode formed inside at least one of the substrates; and a plurality of transparent picture element electrodes respectively formed inside the at least one of the substrates and connected to each other through at least one active device; the transparent common electrode being disposed below one of the transparent picture element electrodes through an insulator layer; and the transparent common electrode being electrically connected to the transparent picture element electrodes adjacent to the one of the transparent picture element electrodes through the at least one active device. The transparent picture element electrodes are disposed such that the transparent picture element electrodes do not overlap the transparent common electrode.

3 Claims, 4 Drawing Sheets

Fig. 1 PRIOR ART
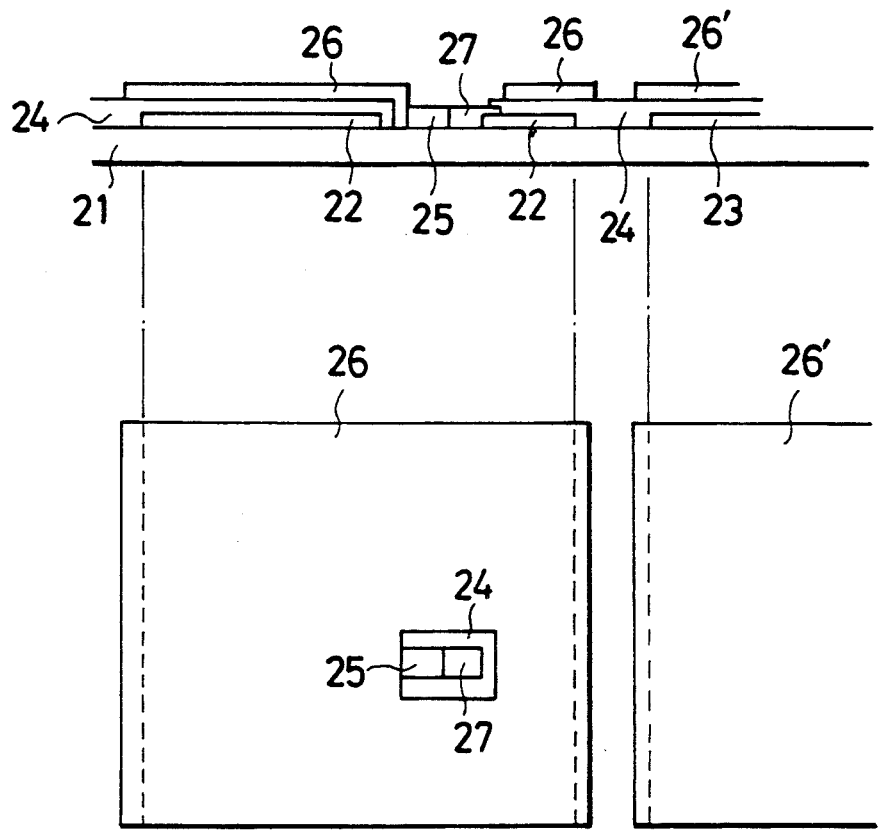
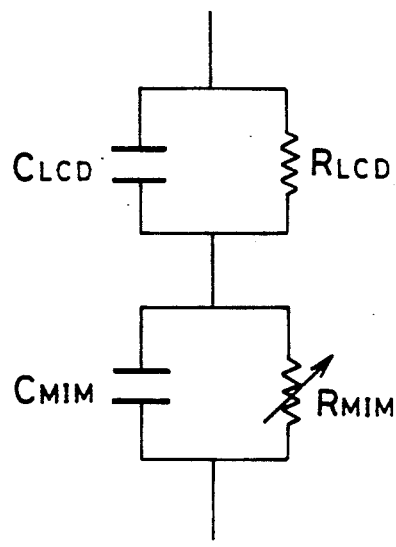
Fig. 2
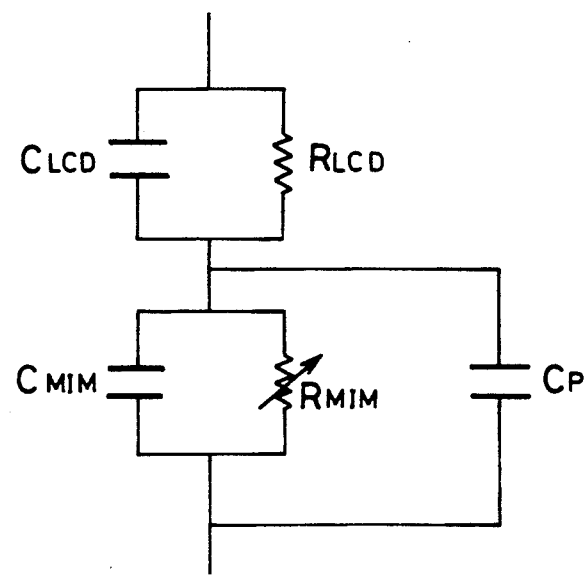
Fig. 3

LIQUID CRYSTAL DISPLAY

BACKGROUND OF THE INVENTION

1. Field of the Invention

The present invention relates to a liquid crystal display widely used for an office automation equipment, a television, etc.

2. Description of the Related Art

A liquid crystal display (LCD) generally uses an active matrix system having at least one active device (TFT, MIM, etc.) in each picture element to make the display large-sized and provide high contrast and duty display. However, in the LCD using the general active matrix system, the active device is arranged in the same position as that of the picture element so that numerical aperture is low in comparison with a simple matrix system.

Therefore, there are various kinds of trials for solving such disadvantages. For example, Japanese Patent Application Laying Open (KOKAI) No. 62-10626 proposed a method for connecting the active device to a display picture element through a contact hole without forming the active device on the same plane as that of the picture element, thereby increasing an area for the display picture element. However, in this method, although the numerical aperture is improved, a common electrode and the display picture element are formed through an insulator film so that a parasitic electric capacity is caused between these constructional elements and a drive voltage is thereby increased and the entire capacity is increased. Therefore, when duty is increased, responsibility becomes bad so that there are new problems in which an uneven display such as flicker is caused and no display is provided.

SUMMARY OF THE INVENTION

It is therefore an object of the present invention to provide a liquid crystal display for increasing numerical aperture and removing parasitic capacity so as to provide high contrast and duty display.

The above object of the present invention can be achieved by a liquid crystal display comprising a liquid crystal layer supported by a pair of substrates therebetween; a transparent common electrode formed inside at least one of the substrates; and a plurality of transparent picture element electrodes respectively formed inside the at least one of the substrates and connected to each other through at least one active device; the transparent common electrode being disposed below one of the transparent picture element electrodes through an insulator layer; and the transparent common electrode being electrically connected to the transparent picture element electrodes adjacent to the one of the transparent picture element electrodes through the at least one active device.

Even when there exists an electric capacity between the common electrode and the picture element electrodes, a connection means for giving no influence of this capacity on the operation of a liquid crystal is used. Namely, the driving element and the insulating film are arranged on the transparent common electrode. Further, the transparent picture element electrodes are disposed such that the transparent picture element electrodes do not overlap the transparent common electrode. Thus, it is possible to increase numerical aperture without causing any parasitic capacity.

Further objects and advantages of the present invention will be apparent from the following description of the preferred examples of the present invention as illustrated in the accompanying drawings.

BRIEF DESCRIPTION OF THE DRAWINGS

FIG. 1 is a schematic view showing one typical example of a prior art liquid crystal display;

FIGS. 2 and 3 are diagrams of equivalent circuits when an MIM element is used as an active device;

DESCRIPTION OF THE PREFERRED EMBODIMENTS

Figure 4:
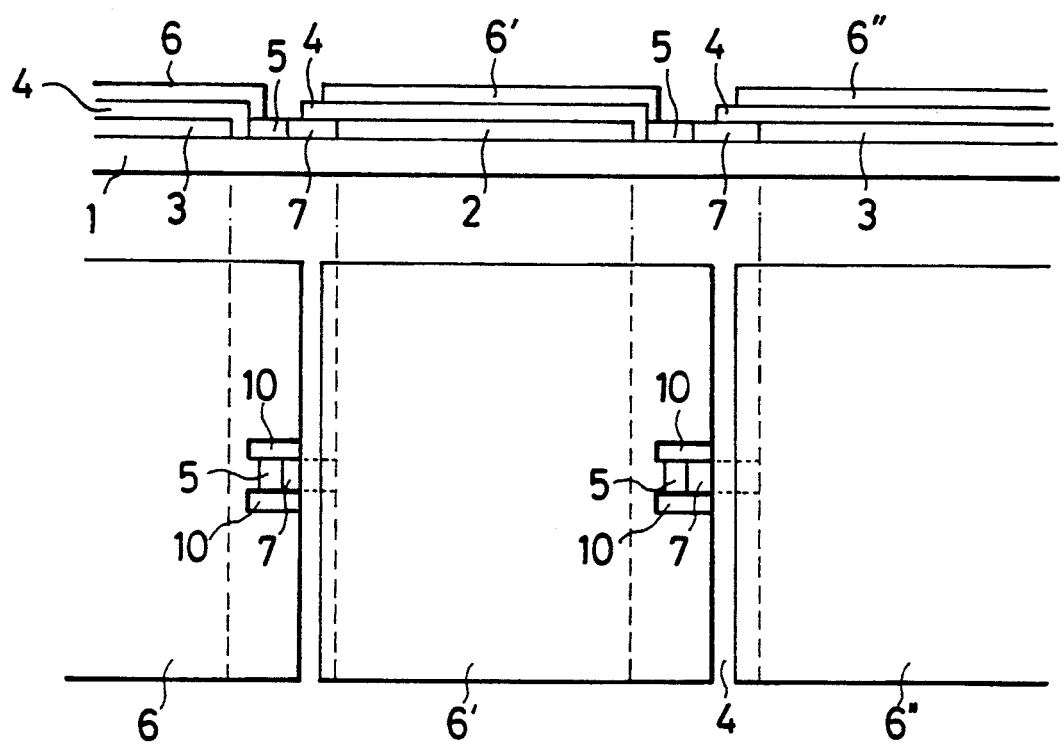
FIGS. 4 and 5 are schematic views showing one typical example of a liquid crystal display in accordance with an embodiment of the present invention.

The preferred embodiments of a liquid crystal display of the present invention will next be described in detail with reference to the accompanying drawings.

A general liquid crystal display will be explained in the following description to clarify the features of the liquid crystal display of the present invention.

FIG. 1 is a schematic view showing one typical example of the prior art liquid crystal display. In this figure, common electrodes 22 and 23 are transparent to increase numerical aperture and an insulator layer is formed on an active device 25 and a display picture element is disposed in an uppermost layer. The active device 25 and transparent picture element electrodes 26 and 26' are connected to each other through a through hole. In FIG. 1, reference numerals 21, 24 and 27 respectively designate a substrate, an insulator layer and an auxiliary electrode.

In this liquid crystal display, the display picture element is also constructed by a display portion in which the active device is disposed, thereby improving numerical aperture and display quality. However, in this liquid crystal display, the common transparent electrodes 22 and 23 overlap the transparent picture element electrodes 26 and 26' through the insulator layer 24 so that these portions unavoidably have a parasitic capacity.

A circuit between a liquid crystal section and an active device section must be closed in the liquid crystal display. Accordingly, for example, when an MIM device is used as the active device, an equivalent circuit is represented as shown in FIG. 2. However, the liquid crystal display shown in FIG. 1 has the parasitic capacity (Cp) connected in parallel to the active device and an equivalent circuit thereof is represented as shown in FIG. 3.

When there is the parasitic capacity between the liquid crystal section and the active device section, the design with respect to the active device is complicated and the capacity of the entire circuit is increased. Therefore, when the number of scanning lines in the liquid crystal display is increased (in other words, when the time for a signal line is short), dullness of a signal waveform is caused by the parasitic capacity so that no preferable display is provided and flicker is caused in a certain case.

Figure 5:
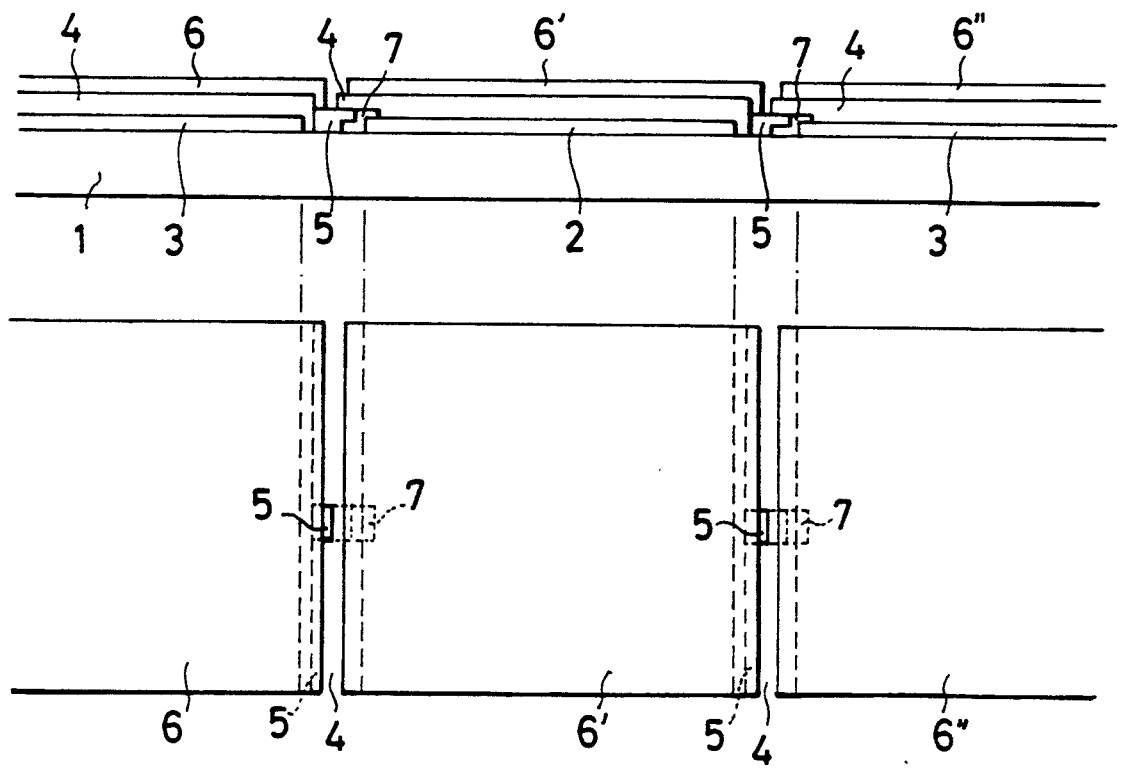

FIGS. 4 and 5 typically show a liquid crystal display of an embodiment of the present invention. As can be seen from FIGS. 4 and 5, in the liquid crystal display of the present invention, an insulator layer 4 is also formed between transparent common electrodes 2, 3 and transparent picture element electrodes 6, 6', 6" so that a parasitic capacity is caused between these constructional portions. However, this parasitic capacity is not connected in parallel to an active device 5. Namely, a liquid crystal section is connected to an active device section so as not to give any influence of the parasitic capacity on the operation of the display. Although there is the parasitic capacity between the transparent common electrode 2 and the transparent picture element electrode 6' (there is also the parasitic capacity between the transparent common electrode 3 and the transparent picture element electrode 6", etc.), a signal is transmitted to the transparent picture element electrode 6' through the transparent common electrode 3 so that this parasitic capacity does not give any influence on the operation of the display.

In FIG. 4, reference numerals 7 and 10 respectively designate an auxiliary electrode and a contact hole.

The liquid crystal display in the present invention can be really manufactured by using generally known materials and manufacturing method, etc., as they are.

First, an insulator transparent substrate is constructed by a glass plate, a plastic plate, a flexible plastic film, etc. A common electrode is formed on this transparent substrate by depositing transparent electrode material (ITO, ZnO:Al, ZnO:Si, etc.) such that the thickness of this electrode material is about several hundred Å to several μm by using a spattering method, an evaporation method, a CVD method, etc., and patterning this electrode material in a predetermined pattern. After an active device is next manufactured, an insulator film is formed and patterned as a through hole only on an electrode of the active device so as to provide an electrical contact for the active device. A transparent electrode material is formed as a picture element electrode by depositing transparent electrode material having a thickness of about several hundred Å to several μm using the spattering method, the evaporation method, the CVD method, etc., and this electrode material is patterned in a predetermined pattern. Thus, an active matrix substrate is manufactured.

The above active device is constructed by a TFT device using a-Si (amorphous silicon), poly-Si, etc., an MIM device using a hard carbon film, SiN$_X$, SiC, Ta$_2$O$_5$, Al$_2$O$_3$, etc. as an insulator layer, an MSI device, a PIN diode, a back to back diode, a varistor, etc.

The above insulator film is constructed by using SiO$_2$, Si$_3$N$_4$, Al$_2$O$_3$, a hard carbon film, polyimide, polyester, epoxy resin, polyamide, PVDC, PVDE, PVA, silicon resin, fluorocarbon, etc. This insulator film is formed by such a material using the CVD method, the spattering method, the evaporation method, a coating method (using spin coating, roll coating, etc.), etc. In this case, the thickness of this insulator film is preferably ranged from several hundred Å to several μm. This insulator film can be preferably constructed by synthesizing a photosensitive polymer such as polyimide, polyester, epoxy resin, etc. at a low temperature (using UV irradiation) so that a photolitho process can be omitted by the patterning processing. In particular, it is preferable to use polyimide (for example, photoneece manufactured by Toray Industries, Inc.) in consideration of heat resistance and electric characteristics.

It is desirable to use a transparent electrode material as an electrode used for the active device. However, the area for the active device normally has a small size less than 20 μm. Therefore, the transparent electrode material may not be used for the active device. Accordingly, the electrode used for the active element can be manufactured by forming a conductive thin film made of e.g., ITO, ZnO:Al, In$_2$O$_3$, SnO$_2$, Pt, Ni, Ag, Al, Au, Cu, Cr, Ti, W, Mo, Ta, etc. using the spattering method, the evaporation method, etc.

With respect to the above active device, there are a three-terminal device such as TFT and a two-terminal device such as a conductor-insulator-conductor (MIM) device. The MIM device is preferable in consideration of structure and simplicity of manufacturing method. In particular, when the hard carbon film is used as the insulating layer of the MIM element, it is possible to manufacture a large-sized liquid crystal display having a high quality and less defects in consideration of the manufacturing method and quality of the hard carbon film.

The hard carbon film is composed of a film (an i-C film, a diamond-like carbon film, an amorphous diamond film which is also called a diamond thin film) including at least one of an amorphous substance or microcrystal with carbon and hydrogen atoms as a main texture forming element.

One feature of the hard carbon film is that the physical properties of this film can be controlled in a wide range in accordance with conditions for manufacturing the hard carbon film as described later since this film is a gaseous phase growth film. Accordingly, the resistance value of the insulator film is provided in a region from a semi-insulator to an insulator. Accordingly, the MIM element preferably used in the present invention is considered to be constructed by an MSI (Metal-Semi-Insulator) device, an SIS (Semiconductor-Insulator-Semiconductor in which the semiconductors are made by doping an impurity at a high concentration) element, etc. described in Japanese Patent Application Laying Open (KOKAI) No. 61-275819.

Figure 6A:
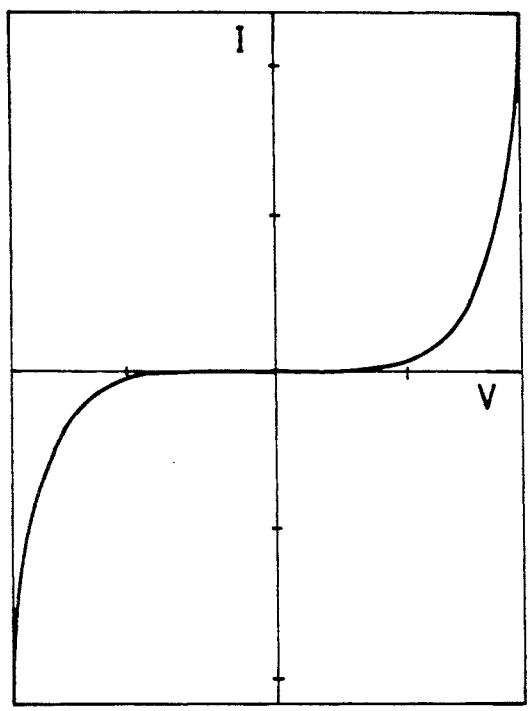
FIGS. 6a and 6b are graphs showing electric current-voltage characteristics of an MIM device.
Figure 6B:
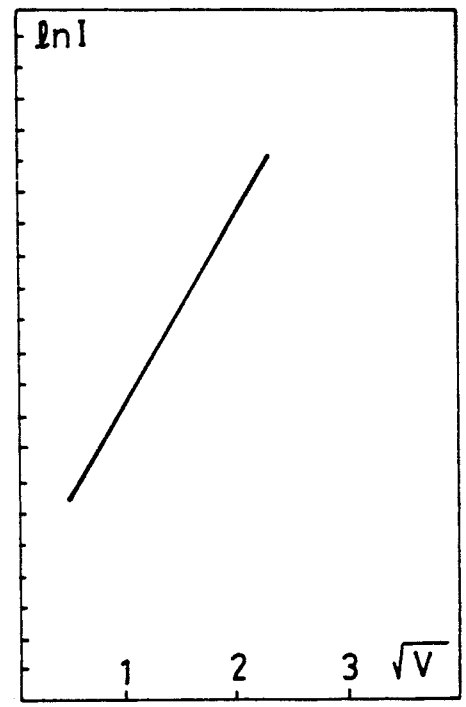

FIGS. 6a and 6b show the electric current-voltage characteristics of the above MIM device approximately represented by the following conductive formulas.

$$I = \kappa \exp(\beta V^{\frac{1}{2}}) \tag{1}$$

where I, V, $\kappa$ and $\beta$ respectively designate electric current, applied voltage, conductive coefficient and Pool-frenkel coefficient.

$$\kappa = \frac{n\mu q}{d} \exp\left(\frac{-\phi}{kT}\right) \propto \frac{1}{\rho d} \ (T = \text{constant}) \tag{2}$$

$$\beta = \frac{1}{kT}\left(\frac{q^3}{\pi\epsilon_1\epsilon_0 d}\right)^{\frac{1}{2}} \propto \frac{1}{\sqrt{\epsilon_1 d}} \ (T = \text{constant}) \tag{3}$$

where n designates carrier density, μ carrier mobility, q charge amount of electron, $\phi$ trap depth, ρ resistivity, d thickness of hard carbon film, k Boltzmann's constant, T atmospheric temperature, $\epsilon_0$ vacuum dielectric constant and $\epsilon_1$ designates dielectric constant of hard carbon.

To widen the control range of the physical properties of the hard carbon film, the hard carbon film may include as one constructional element at least an element of group III in the periodic table at a ratio less than 5 atomic % with respect to all the constructional atoms. Similarly, the hard carbon film may include at least an element of group IV in the periodic table at a ratio less than 20 atomic %, an element of group V at a ratio less than 5 atomic %, an alkali metallic element at a ratio less than 5 atomic %, an nitrogen atom at a ratio less than 5 atomic %, an oxygen atom at a ratio less than 5 atomic %, a chalcogen element at a ratio less than 20 atomic %, and a halogen element at a ratio less than 35 atomic % with respect to all the constructional atoms. The amounts of these elements can be measured by a normal method for analyzing an element, e.g., the Auger analysis. The amounts of these elements can be also adjusted by the amounts of other compounds included in a starting material gas, the conditions for forming the carbon film, etc.

An organic compound gas, especially, a hydrocarbon gas is used to form such a hard carbon film. The phases of such starting materials are not necessarily the gaseous phase at ordinary temperature and pressure. If these starting materials can be vaporized by heating, pressure reduction, etc. through melting, evaporation, sublimation, etc. these starting materials can be used even when the phases of the starting materials are the liquid and solid phases.

The hydrocarbon gas as the starting material gas can be constructed by a gas including at least all the hydrocarbons such as paraffinic hydrocarbon such as $CH_4$, $C_2H_6$, $C_3H_8$, $C_4H_{18}$, hydrocarbon of olefinic series such as $C_2H_4$, hydrocarbon of acetylene series, diolefinic hydrocarbon, aromatic hydrocarbon, etc.

The hydrocarbon gas can be also constructed by a compound including at least a carbon element such as alcohol, ketone, ether, ester, CO, $CO_2$, etc. except for the hydrocarbons.

It is preferable to form the hard carbon film from these starting material gases through a plasma state in which a film forming active species is produced by a plasma method using direct current, low frequency, high frequency, microwave, etc. It is further preferable to use a method using a magnetic field effect since the film is deposited at a low pressure so as to provide a large-sized structure for the film and improve uniformity of the film and manufacture of the hard carbon film at a low temperature. The film forming active species can be also formed by thermal decomposition at a high temperature.

The hard carbon film can be also formed through an ion state produced by an ionization evaporation method, an ion beam evaporation method, etc. Further, the hard carbon film can be formed from a neutral species produced by the vacuum evaporation method, the spattering method, etc., or a combination of these methods.

One example of a stacking condition of the hard carbon film manufactured as above is as follows in the case of the plasma CVD method.
RF output: 0.1 to 50 W/cm$^2$
pressure: $10^{-3}$ to 10 Torr
temperature: room temperature to 950° C. (preferably, room temperature to 300° C., further preferably, room temperature to 150° C.)

The hard carbon film including at least one of a microcrystal having a size several ten Å to several μm and an amorphous material composed of carbon atom C and hydrogen atom H is deposited on the substrate by decomposing the starting material gases into radicals and ions by the plasma states thereof and reacting the radicals and ions. The various kinds of characteristics of the hard carbon film are shown in the following Table 1.

TABLE 1

| | |
|---|---|
| resistivity (ρ) | $10^6 \sim 10^{13}$ Ωcm |
| optical band gap (Egopt) | $1.0 \sim 3.0$ (eV) |
| amount ($C_H$) of hydrogen in the film | $10 \sim 50$ (atomic %) |
| SP$^3$/SP$^2$ ratio | $2/1 \sim 4/1$ |
| Vickers hardness (H) | 2500 to 9500 kg/mm$^{-2}$ |
| refractive index (n) | $1.9 \sim 2.4$ |
| defective density | $10^{17} \sim 10^{19}$ cm$^{-3}$ |

Note) the above values in the film manufacturing method are provided as follows.

The resistivity (ρ) is calculated by I-V characteristics with respect to a coplanar type cell.

The optical band gap (Egopt) is determined by calculating an absorption coefficient (α) from spectral characteristics and the following relation $(\alpha h\nu)^{\frac{1}{2}} = B(h\nu - Egopt)$ The amount ($C_H$) of hydrogen in the film is calculated by integrating a peak near 2900 cm$^{-1}$ from an infrared absorption spectrum and multiplying this integrated value by an absorption cross section A. Namely, this amount is provided as follows. $C_H = A \cdot \int \alpha(w)/w \cdot dw$ The SP$^3$/SP$^2$ ratio is calculated by decomposing the infrared absorption spectrum into Gauss functions respectively belonging to SP$^3$ and SP$^2$ and providing an area ratio with respect to SP$^3$ and SP$^2$ from these Gauss functions.

The Vickers hardness (H) is provided by a micro Vickers hardness tester.

The refractive index (n) is provided by an ellipsometer.

The defective density is provided by ESR.

Figure 7:
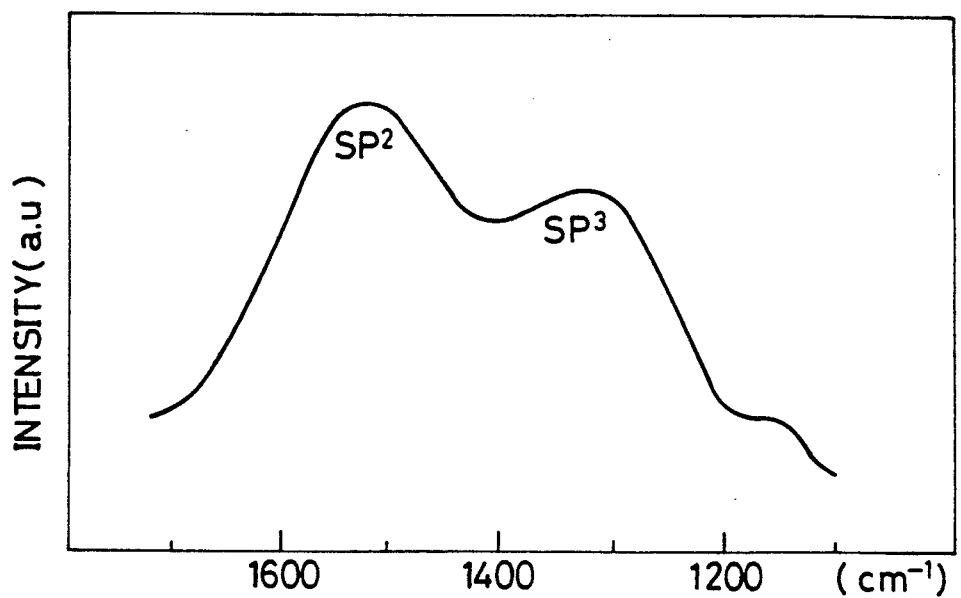
FIG. 7 is a graphical view of Raman spectrum of the hard carbon insulator film used in the MIM device in accordance with the present invention.
Figure 8:
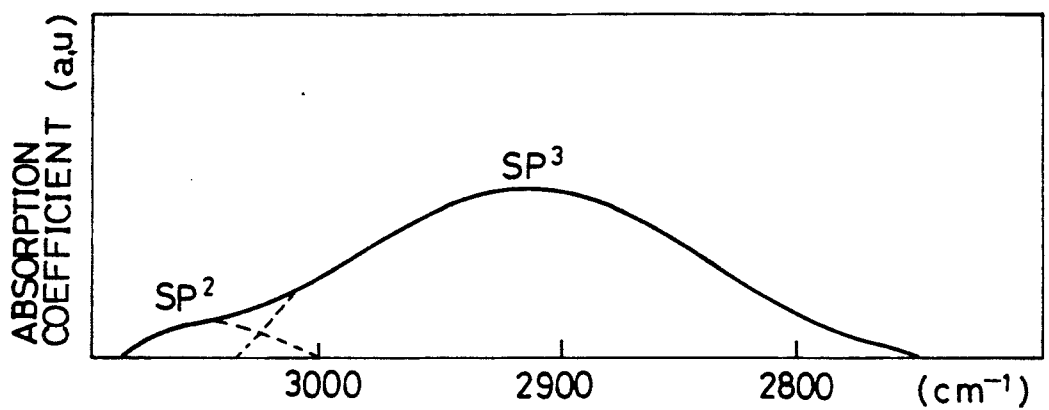
FIG. 8 is a graphical view of IR spectrum of the hard carbon insulator film used in the MIM device in accordance with the present invention.
Figure 9:
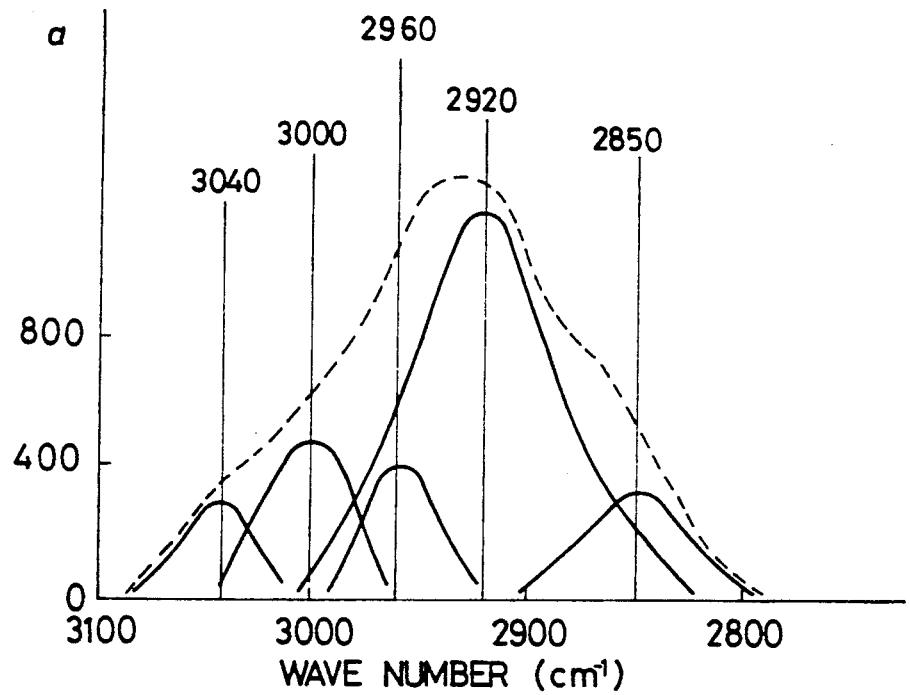
FIG. 9 is a graphical view of Gaussian distribution representing the characteristic of the peak separation of $SP^3$ coupling and $SP^2$ coupling of FIG. 8.

The analyzing results of the hard carbon film thus formed using an IR absorption method and a Raman spectroscopic method are shown in FIGS. 7 and 8. As shown in these figures, it is clear that there exists a mixed interatomic coupling in which a carbon atom forms hybrid orbitals of SP$^3$ and SP$^2$. The ratio of the SP$^3$ and SP$^2$ couplings can be approximately assumed by separating the peaks of the IR spectrum from each other. With respect to the IR spectrum, spectrums overlapping each other in many modes are measured at 2800 to 3150 cm$^{-1}$, but the peaks thereof corresponding to the respective wave numbers are known with respect to assignment. Accordingly, as shown in FIG. 9, these peaks are separated from each other by a Gaussian distribution and respective peak areas are calculated to provide a ratio thereof, thereby obtaining the SP$^3$/SP$^2$ ratio.

Further, it is known that the film is in an amorphous state (a-C:H) or an amorphous state including a microcrystal particle having a size of about several ten Å to several μ m in accordance with a diffraction distribution using an X ray and an electron beam.

In the case of the plasma CVD method generally suitable for mass production, the resistivity value and hardness of the film are increased as the RF output is decreased. Further, the life of the active species is increased as the above pressure is decreased. Accordingly, the temperature of the substrate is reduced and the large-sized film is uniformed and there is a tendency that the resistivity and hardness of the film are increased. Further, since the plasma density is reduced at a low pressure, a method using a magnetic confinement effect is especially effective to increase the resistivity of the film.

This method has the features that the hard carbon film having a good quality can be formed in a condition of a relatively low temperature of about room temperature to 150° C. Accordingly, this method is optimal to reduce temperature in a process for manufacturing the MIM device. Therefore, the degree of freedom with respect to the selection of a material used for the substrate is increased and the temperature of the substrate can be easily controlled, thereby obtaining a large-sized and uniform film. The structure, physical properties, etc. of the hard carbon film can be controlled in a wide range as shown in the Table 1 so that it is possible to freely design device characteristics. Further, the dielectric constant of the film is 3 to 5 and is therefore small in comparison with the dielectric constants of $Ta_2O_5$, $Al_2O_3$ and $SiN_x$ generally used for the MIM device. Accordingly, when a device having the same electric capacity is manufactured, the size of the device can be made large so that it is not necessary to perform a fine processing with respect to this device and yield is improved. In this case, the capacity ratio with respect to the LCD and the MIM element is required to be approximately $C_{LCD}:C_{MIM}=10:1$ in consideration of a condition for operating the display. Further, the hardness of the hard carbon film is high so that the hard carbon film is not easily damaged in a rubbing processing when a liquid crystal material is sealed, thereby improving yield.

The hard carbon film used as an insulating film of the MIM device for operating the liquid crystal desirably has a thickness about 100 to 8000 Å and a resistivity value $10^6$ to $10^{13}$ Ω cm.

In addition, the thickness of the hard carbon film is desirably set to be a value equal to or greater than 200 Å in consideration of margins with respect to a driving voltage and a withstand voltage (an insulator breakdown voltage). Further, the film thickness is desirably set to be a value less than 6000 Å such that there are no practical problems about an uneven color caused the difference in cell gap between picture element and MIM device sections. Accordingly, it is further preferable that the hard carbon film has a thickness of 200 to 6000 Å and a resistivity value of $5 \times 10^6$ to $10^{12}$ Ω cm.

The number of defects of the device caused by pin holes of the hard carbon film is increased as the film thickness is decreased. This number is especially increased and a defective ratio is greater than 1% when the film thickness is less than 300 Å. Accordingly, the uniformity of a film face (the uniformity of the element characteristics) cannot be secured. For example, the film thickness can be accurately controlled with a limit value of about 30 Å and dispersion in film thickness exceeds 10%. Therefore, it is desirable to set the film thickness to a value equal to or greater than 300 Å. It is further desirable to set the film thickness to a value less than 4000 Å such that the hard carbon film is not easily separated from the other film portions by stress applied thereto and the display is operated at a low duty ratio desirably less than 1/1000. Accordingly, it is further preferable that the thickness of the hard carbon film is 300 to 4000 Å and the resistivity thereof is $10^7$ to $10^{11}$ Ω cm.

As mentioned above, in accordance with the above formula (3), $$\beta \propto \frac{1}{\sqrt{\epsilon d}}$$

the coefficient $\beta$ is increased as the dielectric constant $\epsilon$ is decreased so that a ratio with respect to on current and off current $I_{ON}$ and $I_{OFF}$ can be set to be large. Therefore, it is possible to operate the LCD at a lower duty ratio so that the LCD of high density can be realized. Further, since the film hardness is high, the hard carbon film is not easily damaged in a rubbing processing when a liquid crystal material is sealed, thereby improving yield. In consideration of the above-mentioned points, the cost of the LCD can be reduced and the LCD of high density having color gradations can be realized by using the hard carbon film.

Figure 10:
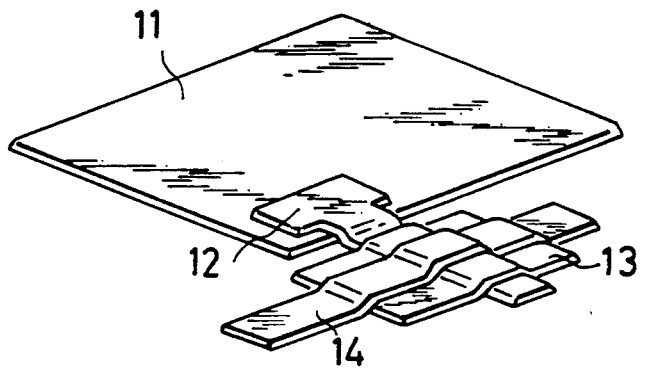
FIG. 10 is a schematic view showing the structure of the MIM device.

In a method for manufacturing the MIM device, a transparent common electrode material is stacked on a transparent substrate and is patterned. Thereafter, a metallic thin film for a lower electrode is formed by the evaporation method, the spattering method, etc. and is patterned by wet or dry etching in a predetermined pattern, thereby forming the lower electrode. The lower electrode is then coated with a hard carbon film by the plasma CVD method, the ion beam method, etc., and is thereafter patterned as an insulator film in a predetermined pattern by a dry etching method, wet etching method or a lift-off method using a resist agent. Next, the insulating film is coated with a metallic thin film for an upper electrode by the evaporation method, the spattering method, etc. and is patterned as the upper electrode in a predetermined pattern. FIG. 10 schematically shows the structure of the MIM device.

The structure of the MIM device is not limited to that shown in FIG. 10, but can be changed in various kinds of modifications. For example, the transparent common electrode may be used as the lower electrode without disposing the lower electrode, or the MIM device may be formed on a side face of the lower electrode. When a connecting portion between active devices is constructed such that this connecting portion is not located in a picture element as shown in FIG. 5, numerical aperture becomes high and display quality is therefore improved. Such a structure is also effective with respect to the MIM element having a small area and a lateral structure having the MIM device on a side of an electrode is more effective since an apparent device area is small.

The concrete Examples 1 to 3 of the present invention will next be described in detail, but the present invention is not limited to these Examples.

EXAMPLE 1

ITO is deposited by a magnetron spattering method using a pyrex substrate as a transparent substrate such that the thickness of this ITO is about 800 Å, and is patterned as a common electrode. Next, an MIM element using a hard carbon film is manufactured as an active device as follows. Namely, aluminum is deposited on the common electrode by the evaporation method such that the aluminum thickness is about 1000 Å. Thereafter, this aluminum is patterned to form a lower electrode. The hard carbon film is deposited on this lower electrode such that the thickness of the hard carbon film is about 800 Å. The hard carbon film is then patterned by dry etching. Further, nickel is deposited on the hard carbon insulator film by the evaporation method such that the nickel thickness is about 1000 Å. This nickel is then patterned to form an upper electrode, thereby manufacturing an MIM device.

Next, a polyimide film is coated and patterned such that the thickness of this film is about 1.5 μm and there is no polyimide film only on a portion of the upper electrode of the MIM element. The ITO is then stacked as a display picture element electrode by the magnetron spattering method such that the thickness of this ITO is about 1200 Å. This ITO is then patterned such that the display picture element electrode and the transparent common electrode do not overlap each other.

Next, the ITO is deposited on the Pyrex substrate as another transparent substrate by the patterning method such that the thickness of this ITO is about 1000 Å. Thereafter, this ITO is patterned in the shape of a stripe to form a common picture element electrode.

Next, a polyimide film is formed on the above both substrates as an orientation film and a rubbing operation is performed with respect to this polyimide film. These substrates are opposed to each other such that the respective picture element electrodes are located on the inner sides of the substrates. Then, these substrates are stuck together with each other through a gap material. A commercially sold liquid crystal material is sealed into a cell formed by the substrates, thereby manufacturing a liquid crystal display. At this time, a condition for forming the hard carbon film is as follows.
pressure: 0.035 Torr
$CH_4$ flow rate: 10 SCCM
RF power: 0.2 W/cm$^2$

EXAMPLE 2

ITO is deposited and patterned on a Pyrex substrate as a transparent common electrode using an E.B. evaporation method such that the thickness of this ITO is about 1500 Å. Then, aluminum is deposited and patterned as a lower electrode such that the thickness of this aluminum is about 1500 Å. Next, a hard carbon film is deposited such that the thickness of this film is about 1200 Å. Then, nickel is deposited as an upper electrode by the E.B. evaporation method such that the thickness of this nickel is about 1000 Å. Thereafter, a nickel and a hard carbon film are patterned in the same pattern. Next, a polyimide film is formed and patterned as an insulating film. A picture element electrode is disposed and patterned on this polyimide film such that the picture element electrode and the common electrode do not overlap each other.

Next, the ITO is deposited on a plastic film as another transparent substrate (an opposite substrate) by the spattering method such that the thickness of this ITO is about 1000 Å. Thereafter, this ITO is patterned in the shape of a stripe to form a common picture element electrode. Further, a color filter is disposed on a side of the film opposite to the picture element electrode, thereby forming the opposite substrate.

A polyimide film is then formed on the above both substrates as an orientation film and a rubbing processing is performed with respect to this polyimide film.

Next, these substrates are opposed to each other such that the respective picture element electrodes are located on the inner sides of the substrates. Then, these substrates are stuck together with each other through a gap material. A commercially sold liquid crystal material is sealed into a cell formed by the substrates, thereby manufacturing a color liquid crystal display. At this time, a condition for forming the hard carbon film is as follows.

pressure: 0.05 Torr
$CH_4$ flow rate: 7 SCCM
RF power: 0.1 W/cm$^2$

EXAMPLE 3

A Pyrex substrate is used as the above-mentioned substrate and the active device is constructed by an MIM device using $Ta_2O_5$ obtained by oxidizing Ta using an anodic oxidation method. The upper electrode is made of chromium and the insulator film is made of $SiO_2$. The other constructions are similar to those in the Example 1. A liquid crystal display is thus manufactured under such a condition.

EXAMPLE 4

ZnO:Al is used as the transparent common electrode and the MIM device using $SiN_x$ is used as the active device. An $SiN_x$ film is formed from $SiH_4$ and $NH_3$ by a P-CVD method such that the thickness of this film is about 800 Å. Nickel is used as the lower electrode and chromium is used as the upper electrode. Polyester is used as the insulator film. The other constructions of the liquid crystal display are similar to those in the Example 1. A liquid crystal display is thus manufactured under such a condition.

In the liquid crystal display of the present invention, the common electrode line is transparent and the active device and the picture element electrode are separately disposed by using the insulator film. Accordingly, it is not necessary to reduce the size of a picture element by the active device and the line so that numerical aperture is improved. In addition, since the common electrode line for transmitting a display signal and a display picture element electrode do not overlap each other, no parasitic capacity is caused and no display ability and image quality are reduced by the dullness of a signal wave-form, etc. Accordingly, in accordance with the present invention, it is possible to provide a liquid crystal display having high numerical aperture, duty and contrast.

Many widely different embodiments of the present invention may be constructed without departing from the spirit and scope of the present invention. It should be understood that the present invention is not limited to the specific examples described in the specification, except as defined in the appended claims.

What is claimed is:

1. A liquid crystal display comprising:
   a liquid crystal layer supported by a pair of substrates therebetween;
   a plurality of transparent common electrodes disposed side by side on at least one of said substrates;
   a plurality of insulator layers respectively disposed on said transparent common electrodes;
   a plurality of transparent picture elements respectively disposed on said insulator layers; and
   a plurality of active devices each disposed between two of said transparent common electrodes adjacent to each other for electrically connecting one of said adjacent transparent common electrodes to said transparent picture element disposed on the other of said adjacent transparent common electrodes.

2. A liquid crystal display according to claim 1, in which said active devices each comprises a metal-insulator-metal element.

3. A liquid crystal display according to claim 1, in which each of said insulator layers is constructed of a hard carbon film.

* * * * *